(12) United States Patent
Sloan et al.

(10) Patent No.: US 7,793,963 B2
(45) Date of Patent: Sep. 14, 2010

(54) BICYCLE CHAINSTAY PROTECTOR

(75) Inventors: Brandon Dale Sloan, Morgan Hill, CA (US); Joseph Edward Buckley, Scotts Valley, CA (US); F. Robert Egger, Watsonville, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 199 days.

(21) Appl. No.: 12/132,458

(22) Filed: Jun. 3, 2008

(65) Prior Publication Data

US 2009/0295120 A1 Dec. 3, 2009

(51) Int. Cl.
*B62J 27/00* (2006.01)

(52) U.S. Cl. .............. 280/304.3; 280/152.3; 280/160; 280/160.1; 280/288.4; 280/293; 474/143; 474/144; 474/145; 474/146; 474/147

(58) Field of Classification Search .............. 280/304.3, 280/152.3, 160, 160.1, 288.4, 293; 474/143, 474/144, 145, 146, 147
See application file for complete search history.

(56) References Cited

U.S. PATENT DOCUMENTS

| | | | |
|---|---|---|---|
| 629,667 A | 7/1899 | Denbigh | |
| 4,105,220 A | 8/1978 | Pacific | |
| 4,138,132 A | 2/1979 | Doyle | |
| 4,226,347 A * | 10/1980 | Rice | 224/418 |
| 4,403,787 A | 9/1983 | Shimano | |
| 4,786,071 A * | 11/1988 | Nagano | 280/304.3 |
| 5,312,303 A * | 5/1994 | Hinschlager | 474/144 |
| 5,397,146 A | 3/1995 | Fischer | |
| D364,836 S * | 12/1995 | Schlangen et al. | D12/127 |
| D376,569 S * | 12/1996 | Fang | D12/127 |
| D445,532 S | 7/2001 | Larson | |
| 6,419,039 B1 | 7/2002 | Wagner | |

\* cited by examiner

*Primary Examiner*—Lesley Morris
*Assistant Examiner*—Marlon A Arce
(74) *Attorney, Agent, or Firm*—Michael Best & Friedrich LLP

(57) ABSTRACT

A bicycle having a wheel and a frame supported by the wheel. The frame includes a wheel support and a stay extending from the wheel support. A stay protector resiliently engages the stay. In one embodiment, the stay includes a tubular-shaped member having an exterior surface, and the stay protector is contoured to substantially match the exterior surface.

18 Claims, 6 Drawing Sheets

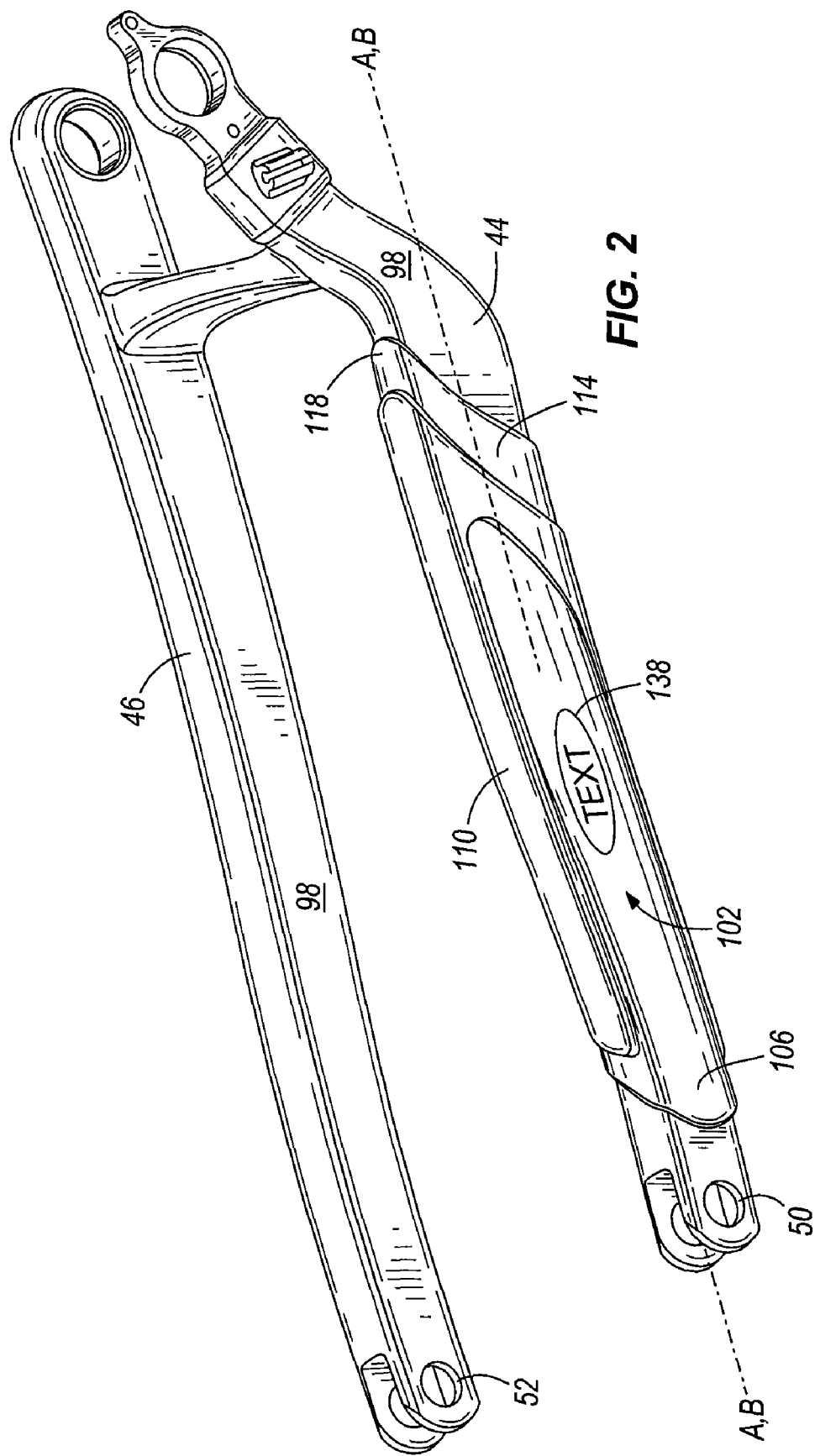

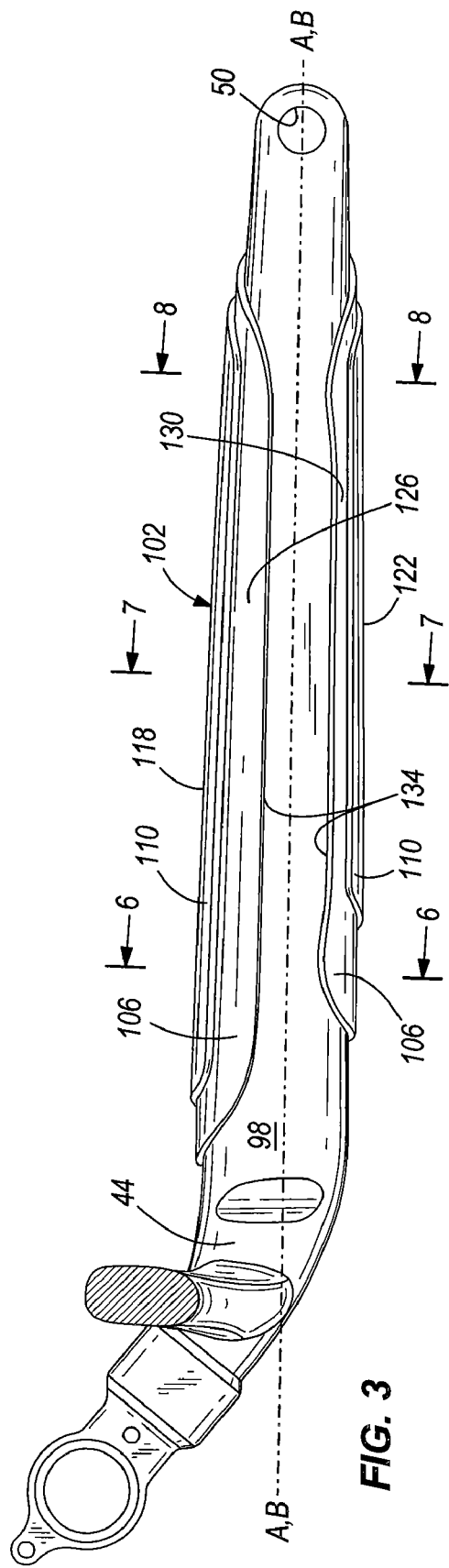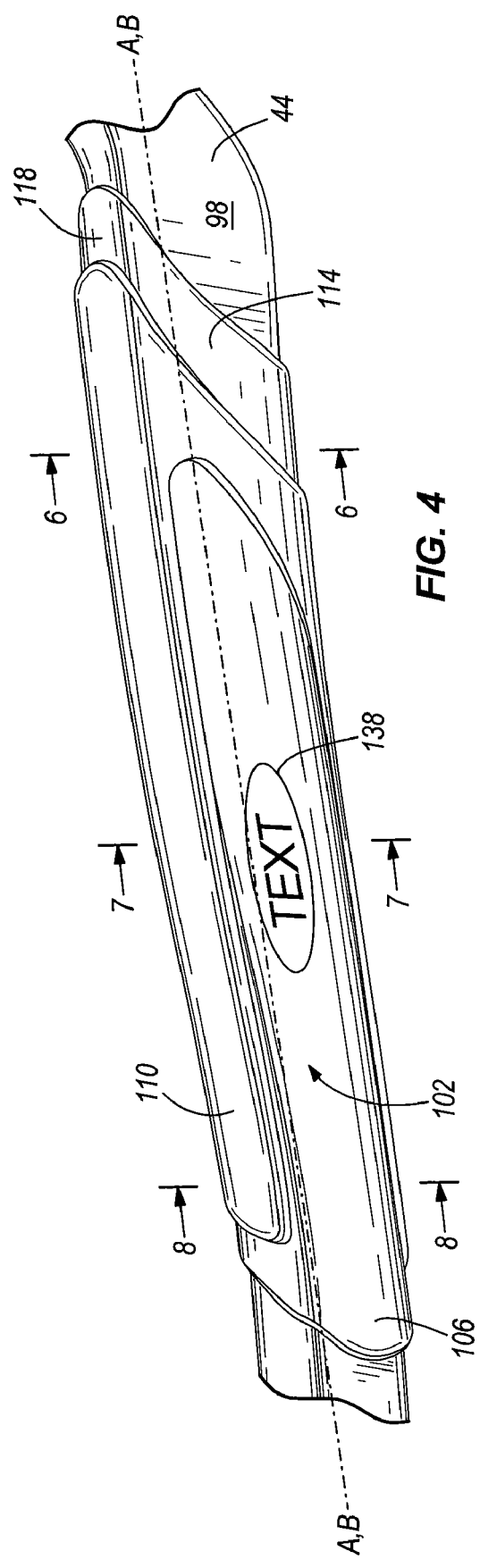

BICYCLE CHAINSTAY PROTECTOR

BACKGROUND

The present invention relates to bicycles. Specifically, the invention relates to chainstay protectors for bicycles.

Chainstay protectors are commonly provided on bicycle chainstays in order to protect the chainstay from damage caused by the chain contacting or being "sucked" into the chainstay. Chainstay protectors are commonly made of a plastic or metallic sheet that is fastened to the chainstay by a fastener (e.g., a screw) or adhesive.

SUMMARY

The present invention provides a bicycle having a chainstay protector that is believed to be easier to attach to the chainstay. More specifically, the invention is particularly applicable to a bicycle having a wheel (e.g., a rear wheel) and a frame supported by the wheel. The frame includes a wheel support and a stay extending from the wheel support. A stay protector resiliently engages the stay (e.g., the right chainstay). By virtue of this design, there is no need for additional fastening mechanisms (e.g., fasteners or adhesive) to attach the chainstay protector.

In one embodiment, the stay comprises a tubular-shaped member having an exterior surface, and the stay protector is contoured to substantially match the exterior surface. Preferably, the stay protector wraps more than about 50% (e.g., 60%-90% or 70%-85%) of the way around the circumferential distance of the tubular-shaped member. In addition, it is preferred that the stay protector is secured to the stay without additional fasteners or adhesive.

The stay protector preferably comprises a partially-tubular-shaped member that has side edges that are spaced by a gap that is smaller than a dimension of the stay to which the protector will be attached. The member has an interior surface defining a circumferential distance, and the gap preferably is less than about 50 percent (e.g., 5%-40% or 10%-30%) of the circumferential distance.

The invention also provides a method of attaching a stay protector to a bicycle. The method comprises providing a bicycle having a wheel and a frame supported by the wheel, the frame including a wheel support and a stay extending from the wheel support, providing a stay protector, and resiliently engaging (e.g., without fasteners or adhesive) the stay protector onto the stay. In one embodiment, resiliently engaging includes flexing the stay protector, placing the stay protector onto the stay, and releasing the stay protector.

Other aspects of the invention will become apparent by consideration of the detailed description and accompanying drawings.

BRIEF DESCRIPTION OF THE DRAWINGS

FIG. 2 is a perspective view of the chainstay protector attached to a chainstay of the bicycle of FIG. 1.

FIG. 3 is a partial left-side view of the chainstay protector and chainstay of FIG. 1.

FIG. 4 is a partial right-side view of the chainstay protector and chainstay of FIG. 1.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, unless specifically or otherwise limited, "connected" and "coupled" are not restricted to physical or mechanical connections or couplings.

Figure 1:
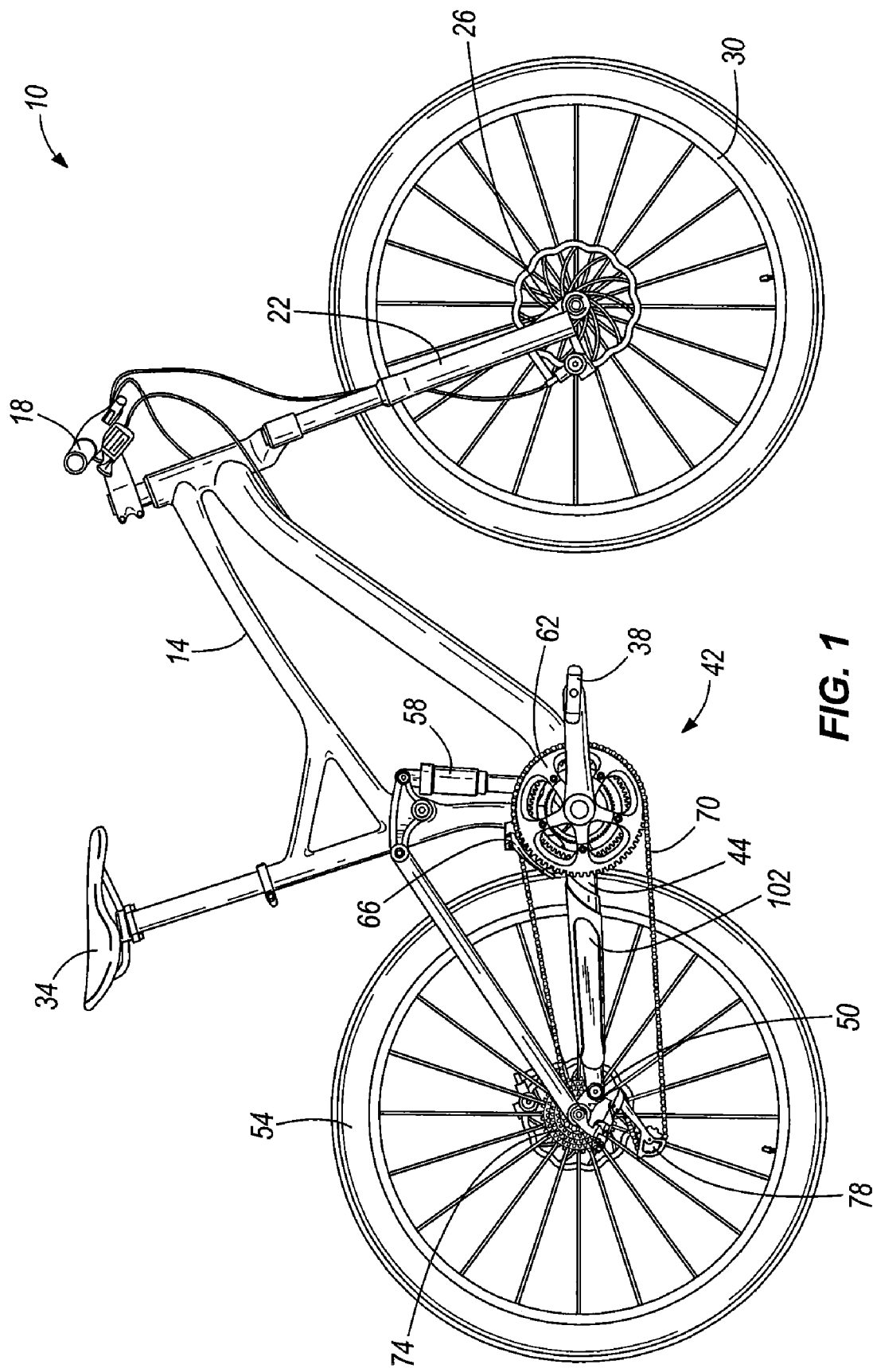
FIG. 1 is a side view of a bicycle that includes a chainstay protector embodying the present invention.

FIG. 1 shows a bicycle 10 that includes a frame 14, handlebars 18, a front fork 22, a front wheel support 26, a front wheel 30, a seat 34, pedals 38, a drive-train 42, a right rear stay 44, a left rear stay 46 (see FIG. 2), a right rear wheel support 50, a left rear wheel support 52 (see FIG. 2), and a rear wheel 54. The illustrated frame 14 is supported by the wheels 30, 54 and includes a rear suspension 58 that is coupled to the frame 14. In other constructions, the bicycle 10 may have other configurations or may include other components. Bicycle components are well known and one skilled in the art will recognize that the invention may be practiced with many different bicycles.

The illustrated drive-train 42 includes front sprockets 62, a front derailleur 66, a chain 70, rear cogs 74, and a rear derailleur 78. The illustrated drive-train 42 is positioned on a right side of the bicycle 10. The illustrated chain 70 connects the front sprockets 62 to the rear cogs 74 through the front and rear derailleurs 66, 78, and the front and rear derailleurs 66, 78 move the chain 70 between different front sprockets 62 and rear cogs 74, respectively. The functionality of bicycle drive-trains 42 is well known to those skilled in the art and will not be discussed further herein. In other constructions, more, less, or different drive-train components may be included as is known by those skilled in the art. For example, a fixed-gear bicycle may include a single sprocket 62, a single rear cog 74, and a chain 70 without front or rear derailleurs 66, 78.

The right rear wheel support 50 is disposed on the right side of the frame 14 and the left rear wheel support 52 is disposed on the opposite or left side of the frame 14. The right and left rear wheel supports 50, 52 engage and support the rear wheel 54 such that the frame 14 is supported by the rear wheel 54. In other embodiments, the right and left rear wheel supports 50, 52 may have a different arrangement or configuration as is known by those skilled in the art.

The illustrated right and left rear stays 44, 46 are components of the rear suspension 58 and extend from the right and left rear wheel supports 50, 52, respectively. The right and left rear stays 44, 46 are arranged such that the rear wheel 54 is positioned between and supported by the two stays 44, 46.

The illustrated right rear stay 44 is positioned with respect to the drive-train 42 such that the chain 70 passes over and under the right rear stay 44.

Figure 6:
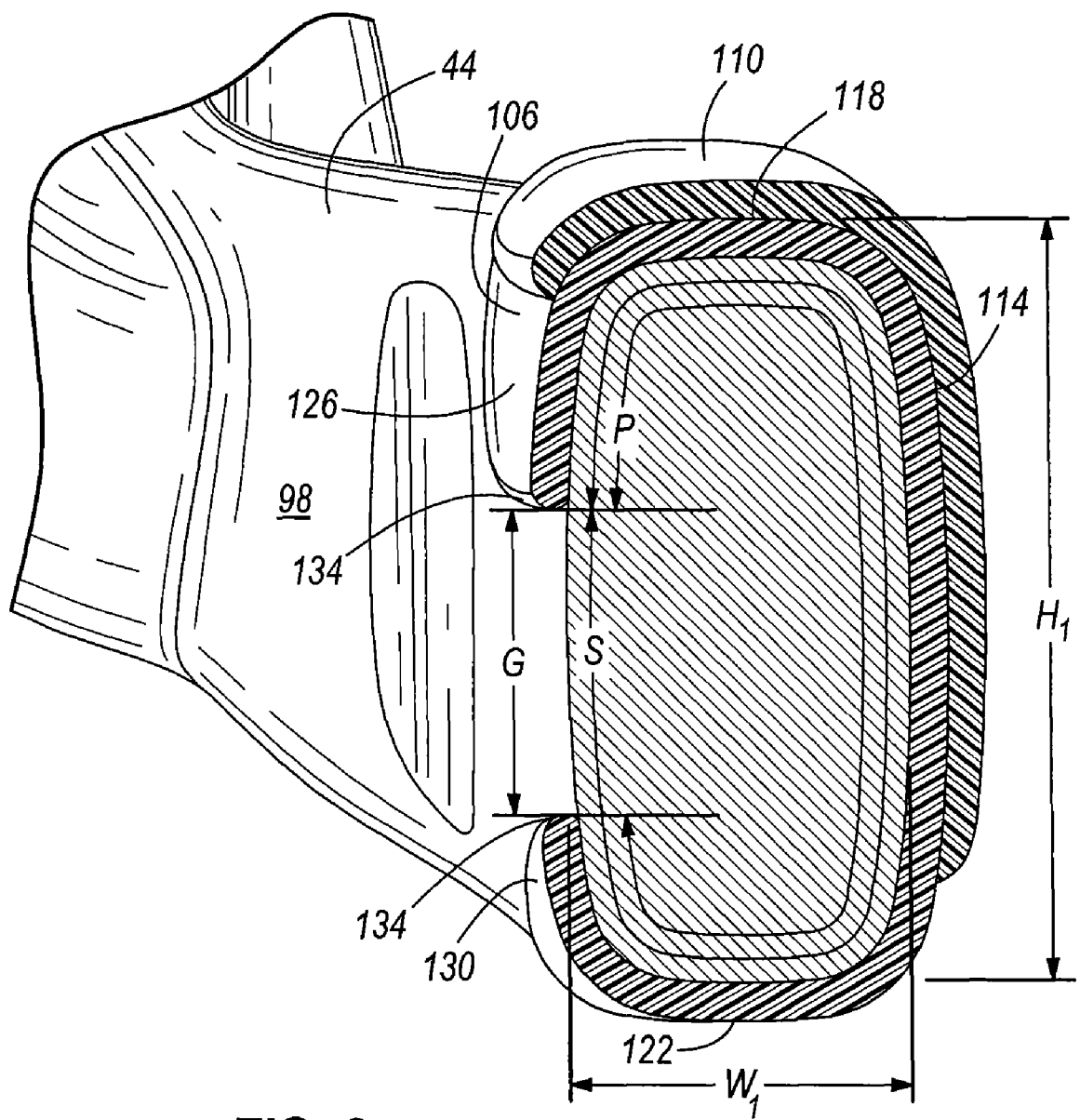
FIG. 6 is a section view taken along the line 6-6 in FIGS. 3 and 4.
Figure 7:
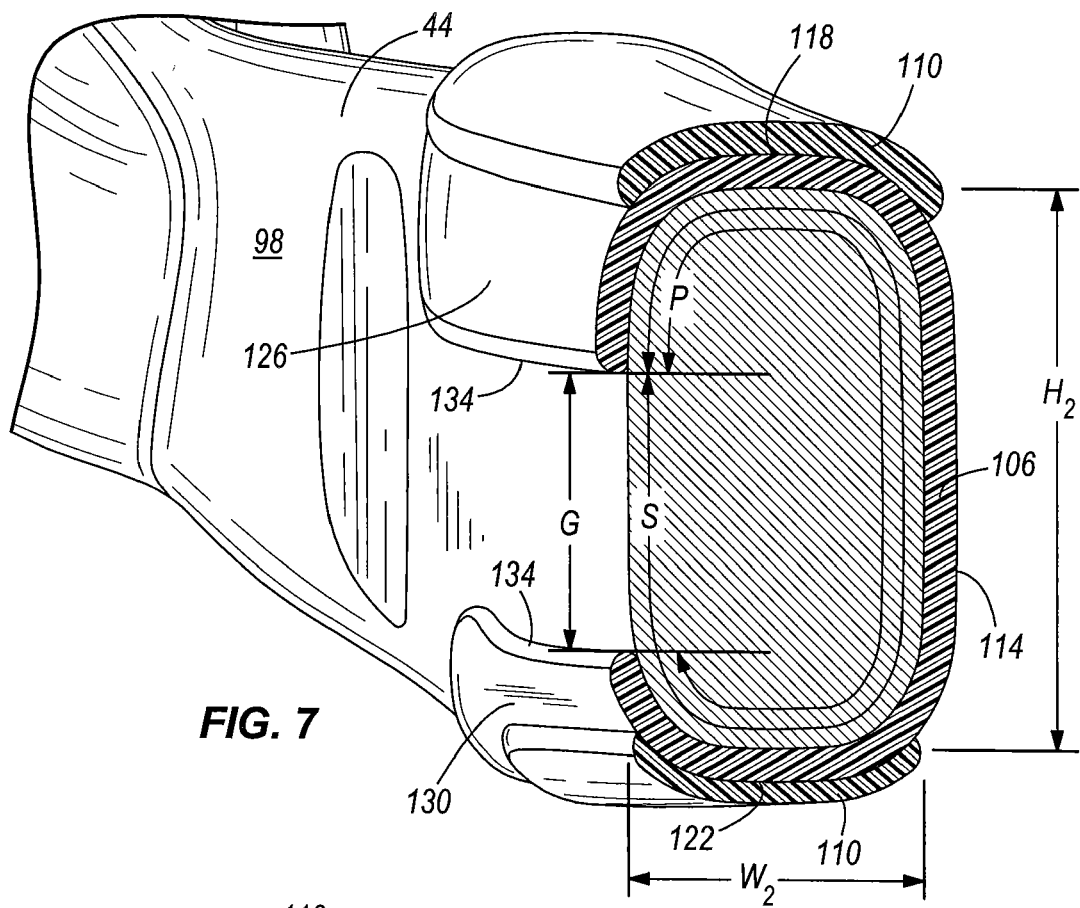
FIG. 7 is a section view taken along the line 7-7 in FIGS. 3 and 4.
Figure 8:
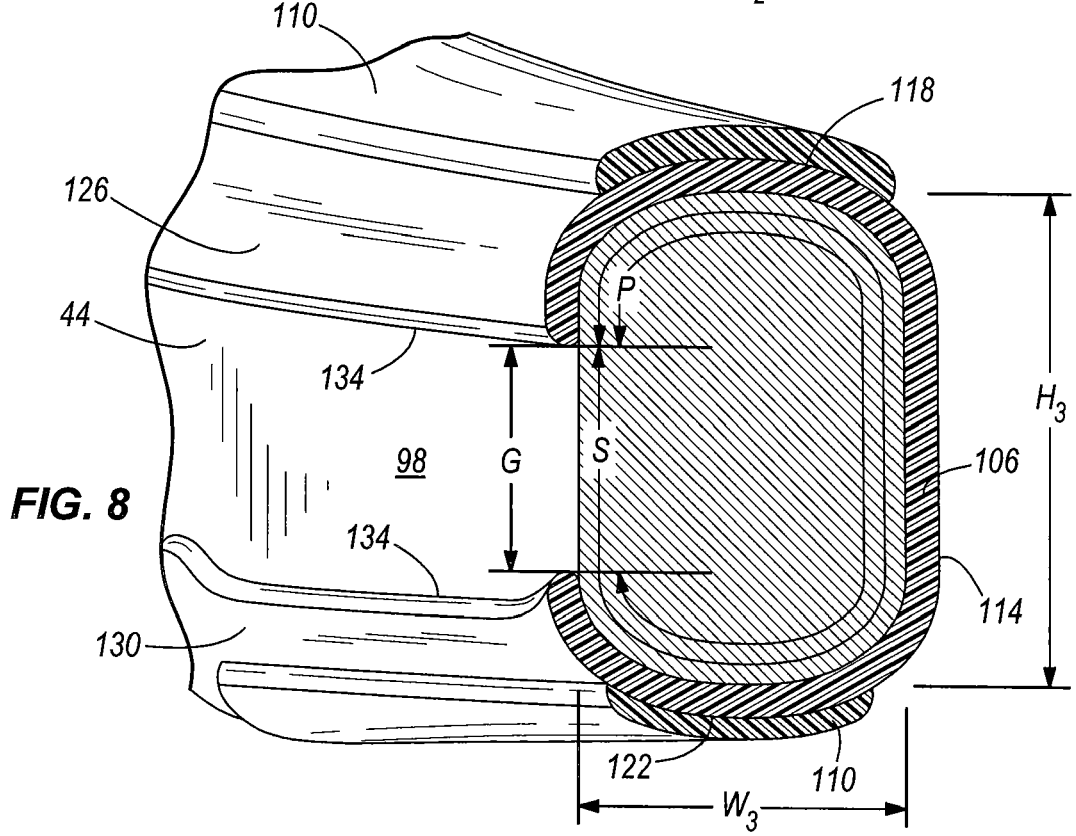
FIG. 8 is a section view taken along the line 8-8 in FIGS. 3 and 4.

Each illustrated rear stay 44, 46 is a tubular-shaped member with an exterior surface 98 that defines a longitudinal axis A and a stay circumferential distance S around the rear stay 44, 46. The shape of the illustrated right and left rear stays 44, 46 varies along the longitudinal axis A such that the right and left rear stays 44, 46 define varying external dimensions. For example, a vertical lateral dimension or a height H, a horizontal lateral dimension or width W, and the circumferential distance S may vary along the longitudinal axis A. FIGS. 6, 7, and 8 show sectional views of the illustrated right rear stay 44 at three locations along the longitudinal axis A. Heights $H_1$, $H_2$, and $H_3$, widths $W_1$, $W_2$, and $W_3$, and distances $S_1$, $S_2$, and $S_3$ correspond to the sections shown, respectively.

In the illustrated embodiment, the height $H_1$ is about 33 millimeters, the width $W_1$ is about 19 millimeters, and the distance $S_1$ is about 85 millimeters. The ratio of the height $H_1$ to the width $W_1$ is about 1.8. In other embodiments, the height $H_1$ and width $W_1$ may be different and the ratio of the height $H_1$ to the width $W_1$ may be different.

In the illustrated embodiment, the height $H_2$ is about 30 millimeters, the width $W_2$ is about 19 millimeters, and the distance $S_2$ is about 85 millimeters. The ratio of the height $H_2$ to the width $W_2$ is about 1.6. In other embodiments, the height $H_2$ and width $W_2$ may be different and the ratio of the height $H_2$ to the width $W_2$ may be different.

In the illustrated embodiment, the height $H_3$ is about 26 millimeters, the width $W_3$ is about 20 millimeters, and the distance $S_3$ is about 75 millimeters. The ratio of the height $H_3$ to the width $W_3$ is about 1.3. In other embodiments, the height $H_3$ and width $W_3$ may be different and the ratio of the height $H_3$ to the width $W_3$ may be different.

In other embodiments, the right and left rear stays 44, 46 may have different exterior surfaces 98 and may be different tubular-shaped members. In addition, one of the right rear stay 44 and the left rear stay 46 may be eliminated. Furthermore, the right and left rear stays 44, 46 may be formed as a single piece with the frame 14 (i.e. a hard-tail frame) or may be arranged with a different spatial relation to the drive-train 42.

A stay protector or chainstay protector 102 resiliently engages the right rear stay 44 such that during normal operation the chainstay protector 102 maintains a constant position and orientation with respect to the right rear stay 44. With reference to FIGS. 2-5, the illustrated chainstay protector 102 is a partially-tubular shaped member constructed of resilient material, such as molded plastic, and includes a resilient body member 106 and a guard member 110. The illustrated resilient body member 106 engages the right rear stay 44 and defines a longitudinal axis B parallel with the chainstay longitudinal axis A. The shape of the illustrated resilient body member 106 varies along the longitudinal axis B such that the resilient body member 106 defines varying internal dimensions (i.e. an internal height and internal width) that substantially match the exterior surface 98 of the right rear stay 44 or tubular member. The chainstay protector 102 is held in resilient engagement with the right rear stay 44 by the frictional forces created by the resiliency of the body member 106 and does not require any fasteners, adhesives, or other fixing means to maintain a constant position and orientation with respect to the right rear stay 44. In the illustrated embodiment, the resilient body member 106 substantially matches the height H and width W of the right rear stay 44. In other embodiments, the height H and width W may be different so the resilient body member 106 does not have substantially similar dimensions to the right rear stay 44.

The illustrated resilient body member 106 includes a central portion 114, a top portion 118, a bottom portion 122, an upper engaging portion 126, and a lower engaging portion 130. The central portion 114 connects the top portion 118 and the bottom portion 122, the upper engaging portion 126 is adjacent the top portion 118, and the lower engaging portion 130 is adjacent the bottom portion 122. The upper engaging portion 126 and the lower engaging portion 130 define side edges 134 of the chainstay protector 102 that are separated by a gap G. The upper engaging portion 126, the top portion 118, the central portion 114, the bottom portion 122, and the lower engaging portion 130 cooperate to define a protector circumferential distance P. The gap G is smaller than the protector circumferential distance P.

Referring to FIGS. 6, 7, and 8, in the illustrated embodiment the protector circumferential distance $P_1$ is about 72 millimeters and the gap $G_1$ is about 13 millimeters resulting in a $G_1/P_1$ ratio of about 18 percent. The protector circumferential distance $P_2$ is about 61 millimeters and the gap $G_2$ is about 25 millimeters resulting in a $G_2/P_2$ ratio of about 40 percent. The protector circumferential distance $P_3$ is about 60 millimeters and the gap $G_3$ is about 15 millimeters resulting in a $G_3/P_3$ ratio of about 25 percent. In other embodiments, the protector circumferential distances P and gaps G may be different, as desired.

With continued reference to FIGS. 6, 7, and 8, the gap G is small enough relative to the stay circumferential distance S to insure that the protector 102 remains on the stay 44. In the illustrated embodiment, the ratio $G_1/S_1$ is about 15 percent, the ratio $G_2/S_2$ is about 18 percent, and the ratio $G_3/S_3$ is about 20 percent. In other embodiments, the ratio G/S may be different, as desired.

With further reference to FIGS. 6, 7, and 8, the protector circumferential distance P of the resilient body member 106 wraps around the stay circumferential distance S of the right rear stay 44 a varying percentage represented by the ratio P/S. The ratio $P_1/S_1$ is about 85 percent, the ratio $P_2/S_2$ is about 72 percent, and the ratio $P_3/S_3$ is about 80 percent. In other embodiments, the ratio P/S may be different, as desired.

The illustrated resilient body member 106 also has an engraved or molded image 138 and is shaped to have an appealing outer appearance when engaged with the right rear stay 44. In other embodiments, the image 138 may be disposed on the guard member 110. In addition, the shape of the chainstay protector 102 may be different to contour to a different tubular-shaped member or stay, or to provide a different outward appearance such that the chainstay protector 102 matches the appearance of the bicycle 10. Furthermore, the chainstay protector 102 may be multiple colors, the same colors, or have more or less artistic detail in order to achieve a desired style.

Figure 5:
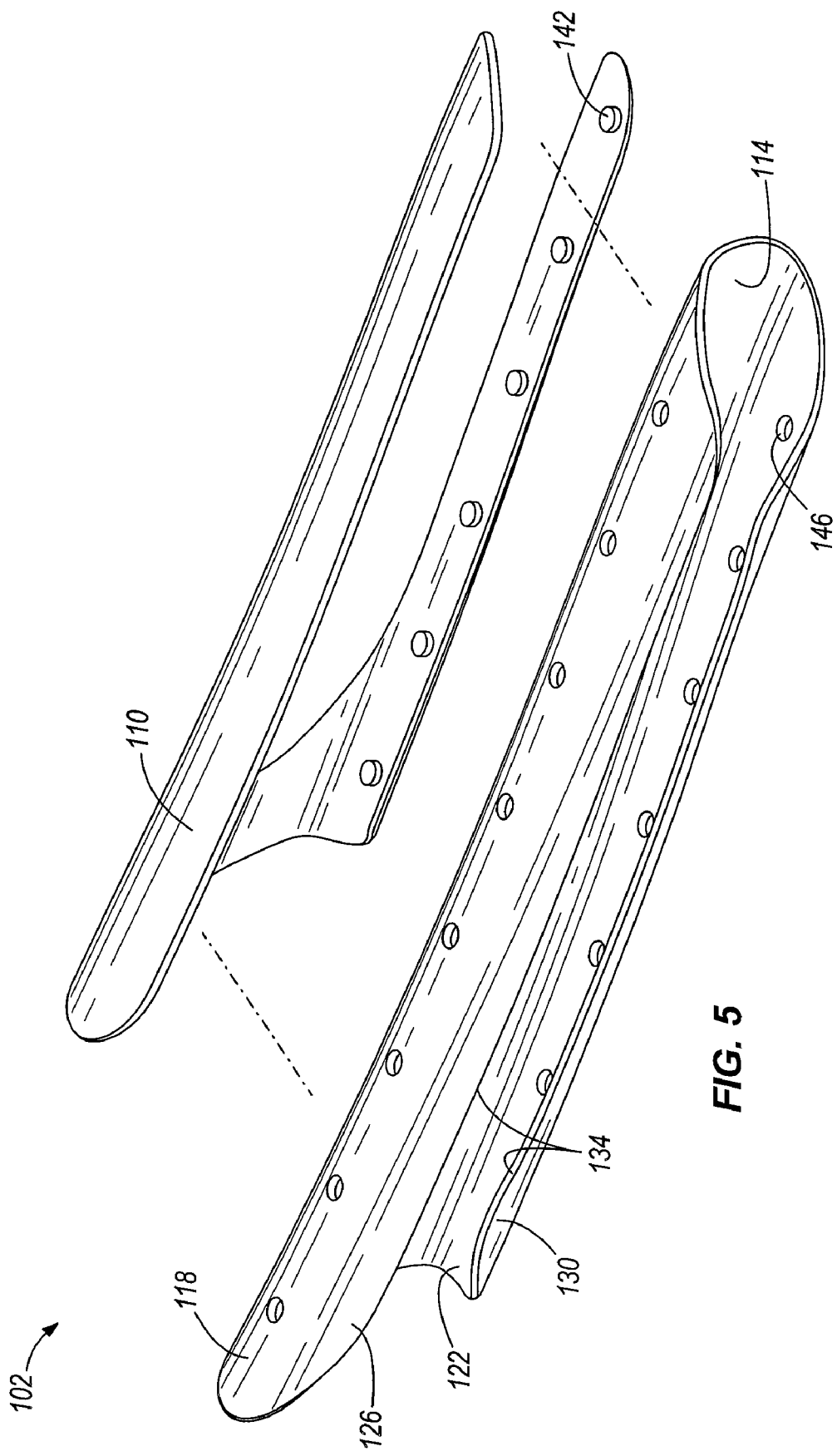
FIG. 5 is an exploded view of the chainstay protector of FIG. 1.

The illustrated guard member 110 is positioned such that the majority of wear from the chain 70 contacting the chainstay protector 102 will be received by the guard member 110, thereby inhibiting damage to the resilient body member 106 and the right rear stay 44. As such, the illustrated guard member 110 covers at least a portion of a top portion 118 of the chainstay protector 102 and at least a portion of a bottom portion 122 of the chainstay protector 102. As shown in FIG. 5, protrusions 142 of the illustrated guard member 110 engage holes 146 formed in the resilient body member 106 such that the chainstay protector 102 is a single unit. The guard member 110 may be removable from the resilient body member 106 such that the guard member 110 may be replaced when significant wear occurs, or the guard member 110 may be fixed to the resilient body member 106 with fasteners or adhesives such that the guard member 110 and resilient body member 106 cannot be easily separated.

In one embodiment, the guard member 110 and the body member 106 are made of different materials. For example, the body member 106 may be a more resilient plastic than the guard member 110 such that the material facilitates the engagement with the right rear stay 44, and the guard member 110 may be made of a harder or more durable material such that the guard member 110 may demonstrate better wear characteristics. In other embodiments, the guard member 110 and the resilient body member 106 may be formed as a single piece such that the chainstay protector 102 is a single component.

In operation, the illustrated chainstay protector 102 resiliently engages the right rear stay 44 such that the chainstay protector 102 maintains a substantially constant position and orientation with respect to the right rear stay 44. To resiliently engage the chainstay protector 102, the chainstay protector 102 is flexed such that the gap G is large enough to accommodate the height H of the right rear stay 44. Once the gap G is large enough, the chainstay protector 102 made be slid onto the right rear stay 44 and placed in a desired position on the right rear stay 44. The chainstay protector 102 may the be released such that the gap G recoils and the chainstay protector 102 resiliently engages the right rear stay 44. Once in place, the chainstay protector 102 is held in place by the friction between the body member 106 and the right rear stay 44, which is created by the resiliency of the resilient body member 106. The chainstay protector 102 inhibits the chain 70 and other objects from damaging the right rear stay 44.

The illustrated chainstay protector 102 may be removed from the right rear stay 44 by flexing the chainstay protector 102 such that the gap G is large enough to fit over the height H of the right rear stay 44. The chainstay protector 102 may then be removed from the right rear stay 44.

Various features and advantages of the invention are set forth in the following claims.

What is claimed is:

1. A bicycle comprising:
   a wheel;
   a frame supported by the wheel, the frame including a wheel support and a stay extending from the wheel support; and
   a stay protector resiliently engaging the stay, the stay protector including a body member having a resilient material, and a guard member attached to the body member and having material that is harder than the resilient material of the body member.

2. The bicycle of claim 1, wherein the wheel support includes two wheel supports positioned on opposing sides of the frame, wherein the stay includes two chainstays, each chainstay extending from a respective one of the wheel supports, wherein the stay protector resiliently engages only one of the stays.

3. The bicycle of claim 2, wherein the wheel is a rear wheel, and wherein the bicycle further comprises a front wheel.

4. The bicycle of claim 1, wherein the stay comprises a tubular-shaped member having an exterior surface, and wherein the stay protector is contoured to substantially match the exterior surface.

5. The bicycle of claim 1, wherein the stay comprises a tubular-shaped member having an exterior surface defining a circumferential distance around the tubular-shaped member, and wherein the stay protector wraps more than about 50% of the way around the circumferential distance of the tubular-shaped member.

6. The bicycle of claim 5, wherein the stay protector wraps between about 60% and about 90% of the way around the tubular-shaped member.

7. The bicycle of claim 6, wherein the stay protector wraps between about 70% and about 85% of the way around the tubular-shaped member.

8. The bicycle of claim 1, wherein the stay protector is secured to the stay without fasteners or adhesive.

9. A stay protector for a bicycle having a wheel and a frame supported by the wheel, the frame including a wheel support and a stay extending from the wheel support, the stay protector comprising:
   side edges;
   a body member including a resilient material adapted to resiliently engage the stay, the body member defining a longitudinal axis; and
   a guard member attached to the body member and including material that is harder than the resilient material of the body member,
   wherein at a location along the axis the body member has an interior surface defining a circumferential distance, and
   wherein the side edges at the location are spaced by a gap that is less than 50 percent of the circumferential distance.

10. The stay of claim 9, wherein the gap is between about 5 percent and about 40 percent of the circumferential distance.

11. The stay of claim 10, wherein the gap is between about 10 percent and about 30 percent of the circumferential distance.

12. The bicycle of claim 9, wherein the stay protector is free of fastener holes and adhesive.

13. A method of attaching a stay protector to a bicycle, the method comprising:
   providing a bicycle having a wheel and a frame supported by the wheel, the frame including a wheel support and a stay extending from the wheel support;
   providing a stay protector including a body member having a resilient material, and a guard member having material that is harder than the resilient material of the body member;
   attaching the guard member to the body member; and
   resiliently engaging the stay protector onto the stay.

14. The method of claim 13, wherein resiliently engaging comprises:
   flexing the stay protector;
   placing the stay protector onto the stay; and
   releasing the stay protector.

15. The method of claim 13, wherein the wheel support includes two wheel supports positioned on opposing sides of the frame, wherein the stay includes two chainstays, each chainstay extending from a respective one of the wheel supports, and wherein resiliently engaging comprising mounting the stay protector on only one of the chainstays.

16. The method of claim 13, wherein the stay comprises a tubular-shaped member having an exterior surface defining a circumferential distance around the tubular-shaped member, and wherein resiliently engaging comprises wrapping the stay protector at least about 50% of the way around the circumferential distance of the tubular-shaped member.

17. The method of claim 16, wherein resiliently engaging comprises wrapping the stay protector between about 60% and about 90% of the way around the circumferential distance of the tubular-shaped member.

18. The bicycle of claim 13, wherein resiliently engaging comprises mounting the stay protector to the stay without fasteners or adhesive.

* * * * *